United States Patent [19]

Michel

[11] Patent Number: 4,984,676
[45] Date of Patent: * Jan. 15, 1991

[54] DIRECT TRANSFER SORTING SYSTEM

[75] Inventor: Thomas J. Michel, Oakland Park, Fla.

[73] Assignee: G B Instruments, Inc., Hollywood, Fla.

[*] Notice: The portion of the term of this patent subsequent to Jan. 23, 2007 has been disclaimed.

[21] Appl. No.: 430,641

[22] Filed: Nov. 2, 1989

Related U.S. Application Data

[63] Continuation of Ser. No. 112,451, Oct. 26, 1987, Pat. No. 4,895,242.

[51] Int. Cl.⁵ .............................................. B65G 47/46
[52] U.S. Cl. ................................... 198/365; 198/704; 198/370
[58] Field of Search ............... 198/365, 370, 360, 442, 198/704; 222/502; 221/68; 209/900, 933

[56] References Cited

U.S. PATENT DOCUMENTS

| | | |
|---|---|---|
| 904,680 | 11/1908 | Burrows . |
| 2,387,457 | 10/1945 | McIlwrick . |
| 2,626,828 | 1/1953 | Morgan . |
| 2,732,163 | 1/1956 | Senzani . |
| 2,993,724 | 7/1961 | Pakulla . |
| 3,167,192 | 1/1965 | Harrison et al. . |
| 3,269,520 | 8/1966 | Bishor et al. . |
| 3,348,359 | 10/1967 | Lasbrey . |
| 3,463,298 | 8/1969 | Harrison . |
| 3,524,005 | 8/1970 | Scott . |
| 3,669,245 | 6/1972 | Wooten et al. ........................ 198/365 |
| 3,757,939 | 9/1973 | Henig . |
| 3,782,541 | 1/1974 | Wood . |
| 3,884,370 | 5/1975 | Bradshaw et al. . |
| 3,974,909 | 8/1976 | Johnson . |
| 4,004,681 | 1/1977 | Clewett et al. ........................ 198/365 |
| 4,008,813 | 2/1977 | Leersnijder . |
| 4,089,404 | 5/1978 | Venzke . |
| 4,183,707 | 1/1980 | D'Aloin . |
| 4,310,276 | 1/1982 | Castagnoli . |
| 4,375,256 | 3/1983 | Selleri . |
| 4,509,635 | 4/1985 | Emsley ................................ 198/365 |
| 4,567,988 | 2/1986 | Weibel . |
| 4,688,678 | 8/1987 | Zue et al. . |
| 4,895,242 | 1/1990 | Michel ................................ 198/365 |

FOREIGN PATENT DOCUMENTS

| | | |
|---|---|---|
| 894172 | 10/1953 | Fed. Rep. of Germany . |
| 18951 | 9/1928 | Netherlands . |
| 241598 | 10/1925 | United Kingdom ................ 198/365 |
| 1040915 | 9/1966 | United Kingdom . |

*Primary Examiner*—Joseph E. Valenza
*Attorney, Agent, or Firm*—Polster, Polster and Lucchesi

[57] ABSTRACT

Articles to be sorted are loaded into carriers which move along a predetermined path that has groups of receptacles under and adjacent to it. Each carrier has gates or doors which are normally "closed" to define a bottom that can hold an article within that carrier, but which can be "opened" to release that article for direct transfer into a selected one of the receptacles, all of which are positioned below the level of that carrier. The gates or doors of the carriers are arranged so they can selectively and directly transfer articles into the centermost of a group of transversely-positioned receptacles, into the receptacle that is disposed outwardly of that centermost receptacle, or into the receptacle that is disposed inwardly of that centermost receptacle. As a result, the direct transfer sorting system of the present invention obviates the bulky and expensive chutes and guides which have been required by prior sorting systems.

9 Claims, 6 Drawing Sheets

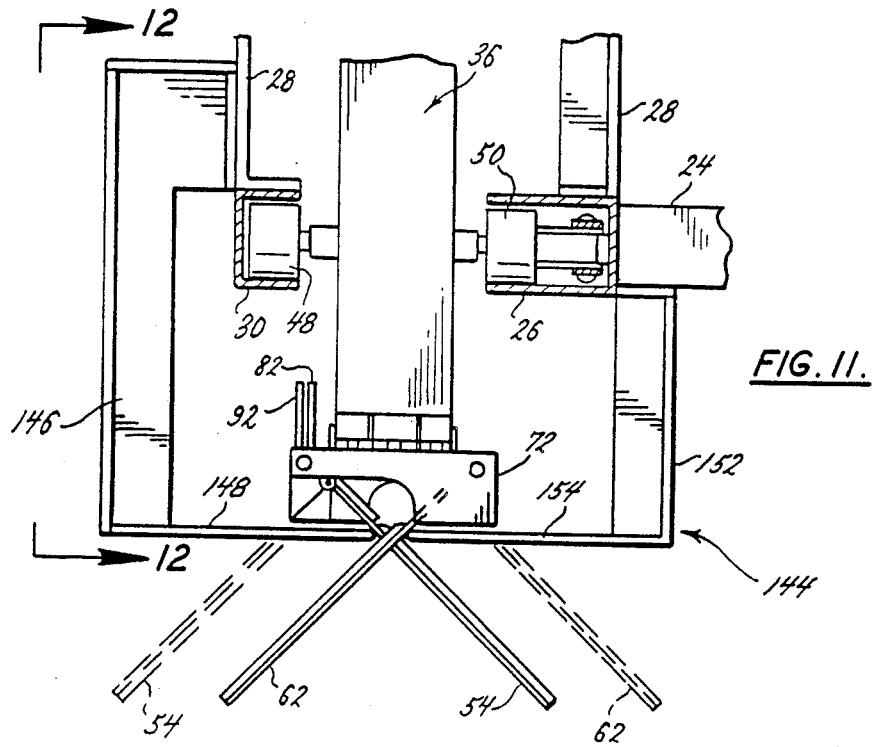
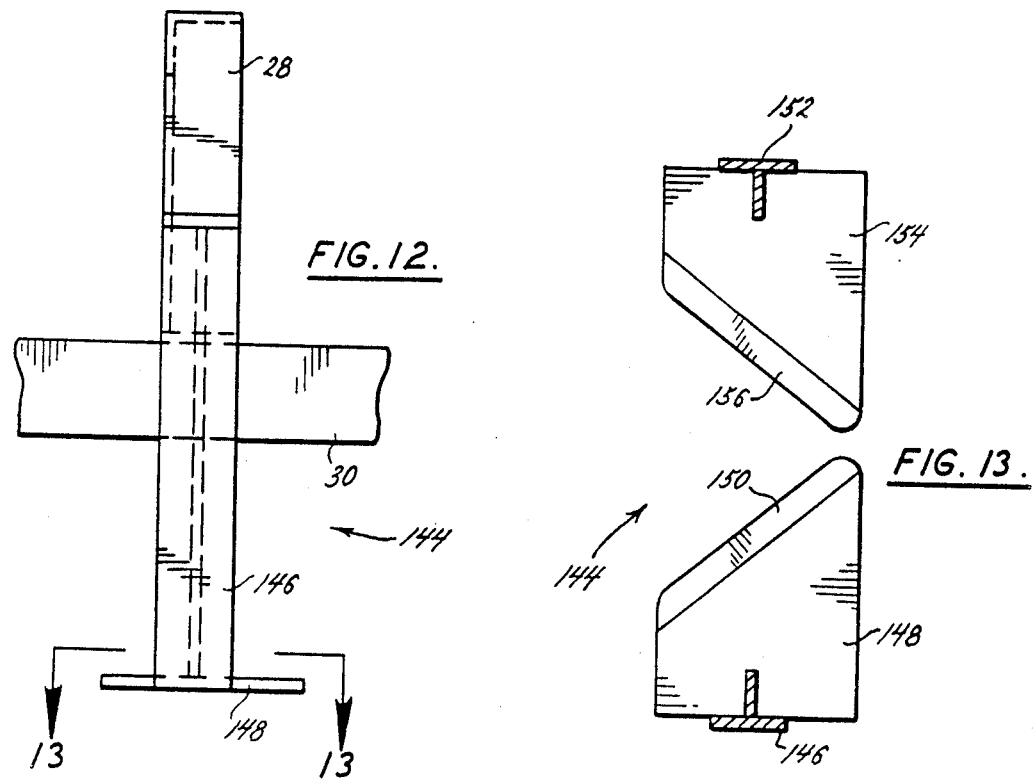

DIRECT TRANSFER SORTING SYSTEM

This is a continuation of copending application Ser. No. 112,451, filed on Oct. 26, 1987 now U.S. Pat. No. 4,895,242.

SUMMARY OF THE INVENTION

Articles to be sorted are loaded into carriers which move along a predetermined path that has groups of receptacles below and adjacent to it. Each carrier has gates or doors which are normally "closed" to define a bottom that can hold an article within that carrier, but which can be "opened" to release that article for direct transfer into a selected one of the receptacles. The gates or doors of the carriers are arranged so they can selectively and directly transfer articles into the centermost of a group of transversely-positioned receptacles, into the receptacle that is disposed outwardly of that centermost receptacle, or into the receptacle that is disposed inwardly of that centermost receptacle. As a result, the direct transfer sorting system of the present invention obviates the bulky and expensive chutes and guides which have been required by prior sorting systems.

BRIEF DESCRIPTION OF THE DRAWING

In the drawing.

FIG. 11 is a front elevational view of the gate-closing station of the system of FIG. 1;

FIG. 12 is a side elevational view that is taken along the line 12—12 in FIG. 11;

FIG. 13 is a sectional view that is taken along a plane indicated by the line 13—13 in FIG. 12;

DESCRIPTION OF THE PREFERRED EMBODIMENT

Figure 1:
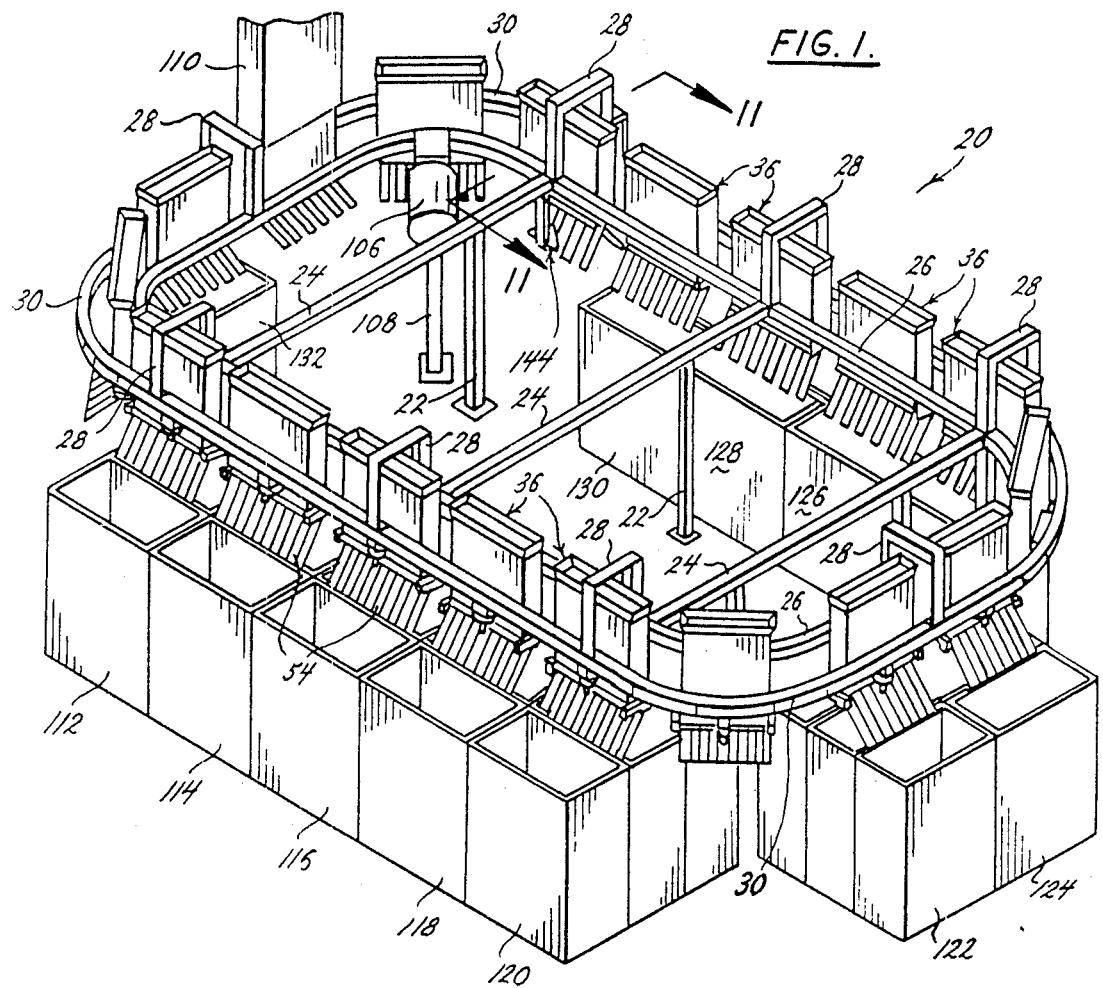
FIG. 1 is a perspective view of one direct transfer sorting system that is made in accordance with the principles and teachings of the present invention.

Referring to the drawing in detail, the numeral 20 generally denotes a direct transfer sorting system which embodies the principles and teachings of the present invention. That system has a number of uprights 22; and parts of those uprights are shown in FIG. 1. Those uprights are preferably secured to the floor of the space in which the system 20 is mounted; and they are arranged in spaced pairs. Beams 24 are secured to, and extend laterally outwardly beyond, the tops of the uprights 22 to support an elongated track 26. As shown particularly by FIG. 4, that track is a deep, horizontal, outwardly-facing channel; and, as shown by FIG. 1, that track has elongated straight sections at the sides and ends thereof which are connected by arcuate sections. As a result, the track 26 provides a deep, continuous, horizontal, outwardly-facing elongated recess. Where desired, access doors or open areas may be provided in the track 26 for insertion or removal of a sprocket chain 32 or for other work on the sorting system. Inverted U-shaped brackets 28 extend upwardly from the top of the track 26, adjacent the ends of the beams 24 and also adjacent other portions of that track; and those brackets support a second track 30. As shown particularly by FIG. 4, that second track is a shallow, horizontal, inwardly-facing channel which confronts the deeper channel 26. As shown particularly by FIG. 1, the track 30 is longer than, but is parallel to, the track 26; and hence the two tracks provide continuous, confronting, parallel, trackways.

Figure 3:
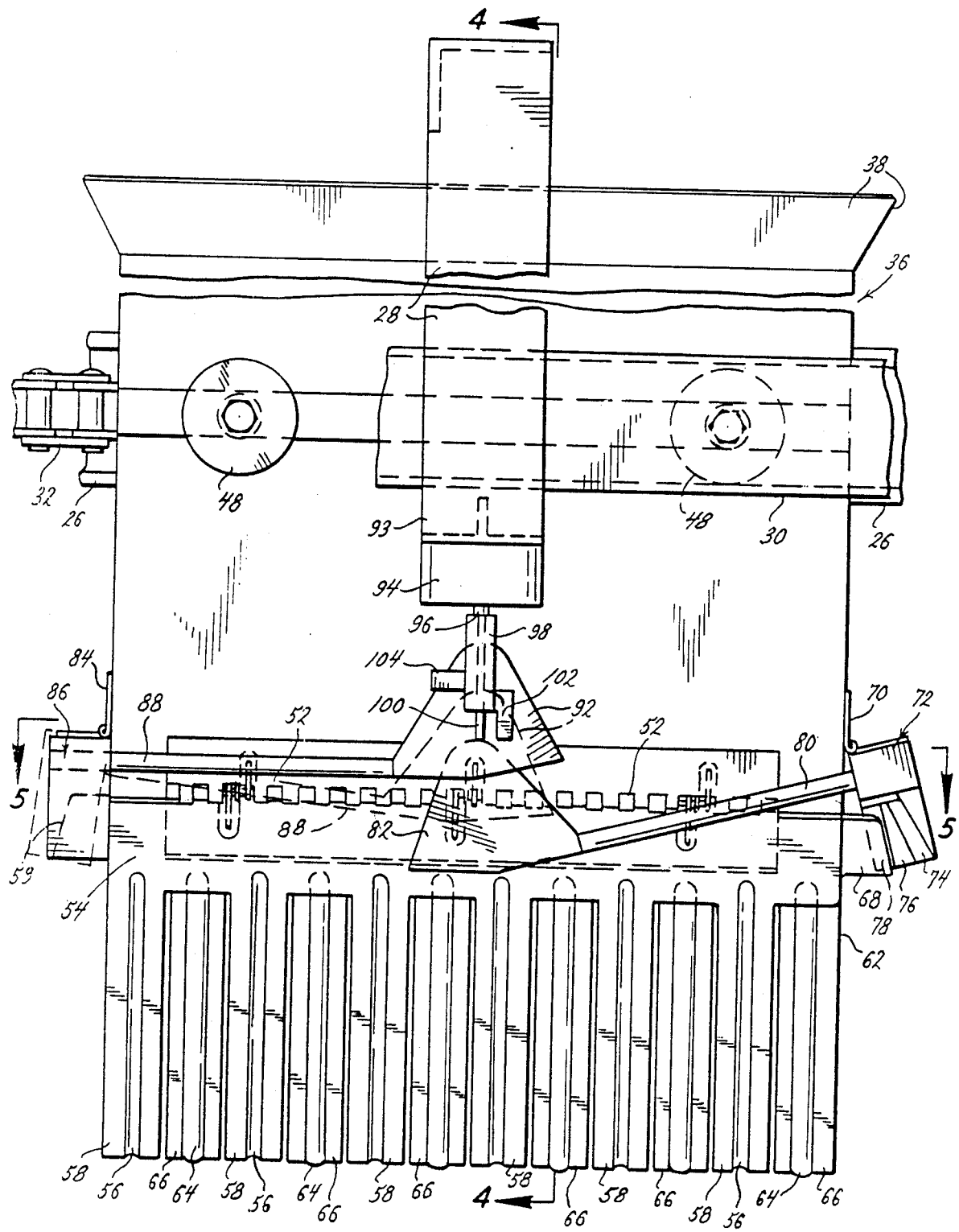
FIG. 3 is a broken, side view, on an even larger scale, of the carrier of FIG. 2 and of part of the supporting and guiding structure for that carrier and for the other carriers of the direct transfer sorting system of FIG. 1.
Figures 4, 7:
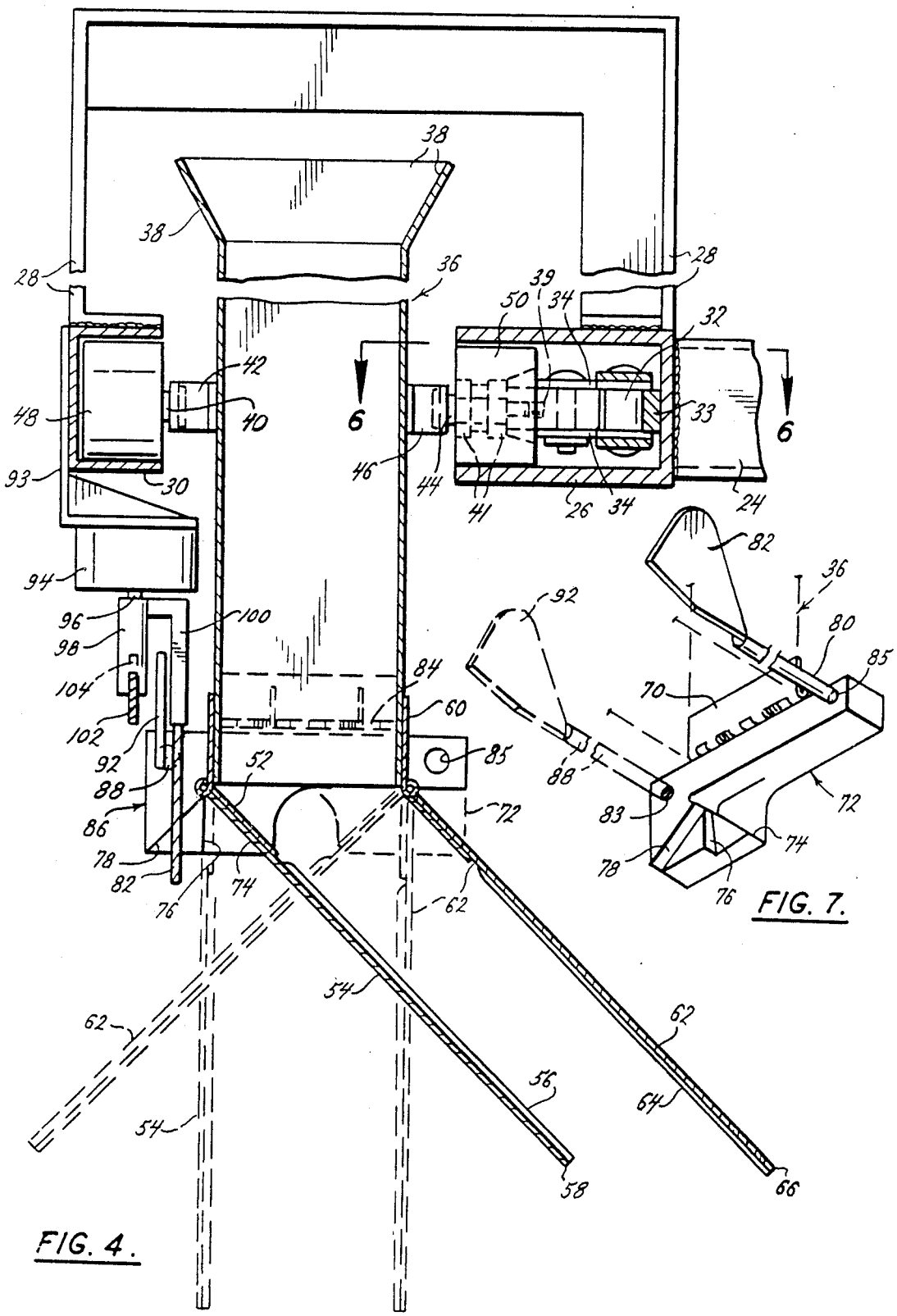
FIG. 4 is a broken, sectional view, on the scale of FIG. 3, which is taken along a plane indicated by the line 4—4 in FIG. 3.
FIG. 7 is a perspective view of one of two latch blocks of the carrier of FIG. 2, and it shows an alternate position for the elongated rod and cam of that latch block by dashed lines.

The sprocket chain 32 is guided by a chainguide 33 at the inner face of the closed end of the track 26, as shown by FIG. 4. Connecting links 34 are secured to the chain 32; and these connecting links have threaded receptacles 39 in the free ends thereof. Those threaded receptacles receive the free ends of stub shafts 44 that are fixedly secured to the right hand sides of carriers 36 by shaft mountings 46, as shown by FIG. 4. Each carrier 36 can have two stub shafts 44 secured to it or can have one stub shaft 44, plus a stub shaft that does not engage a connecting link, secured to it. Rollers 50 are mounted on the stub shafts 44 by suitable anti-friction bearings 41; and those rollers are supported and confined by the track 26. Stub shafts 40 are secured to the opposite sides of the carriers 36 by shaft mountings 42; and rollers 48 are mounted on those stub shafts, by anti-friction bearings, to be supported and confined by the track 30, as shown by FIG. 4. As shown by FIG. 3, each carrier has two rollers 48, and each carrier also has two rollers 50.

Each carrier 36 has two broad planar sides and two narrow planar ends to make each of those carriers rectangular in plan view. Outwardly-directed upper portions 38 are provided for the walls and ends of each carrier to facilitate the introduction of articles into those carriers. If desired, the portions 38 could be deleted.

Figure 5:
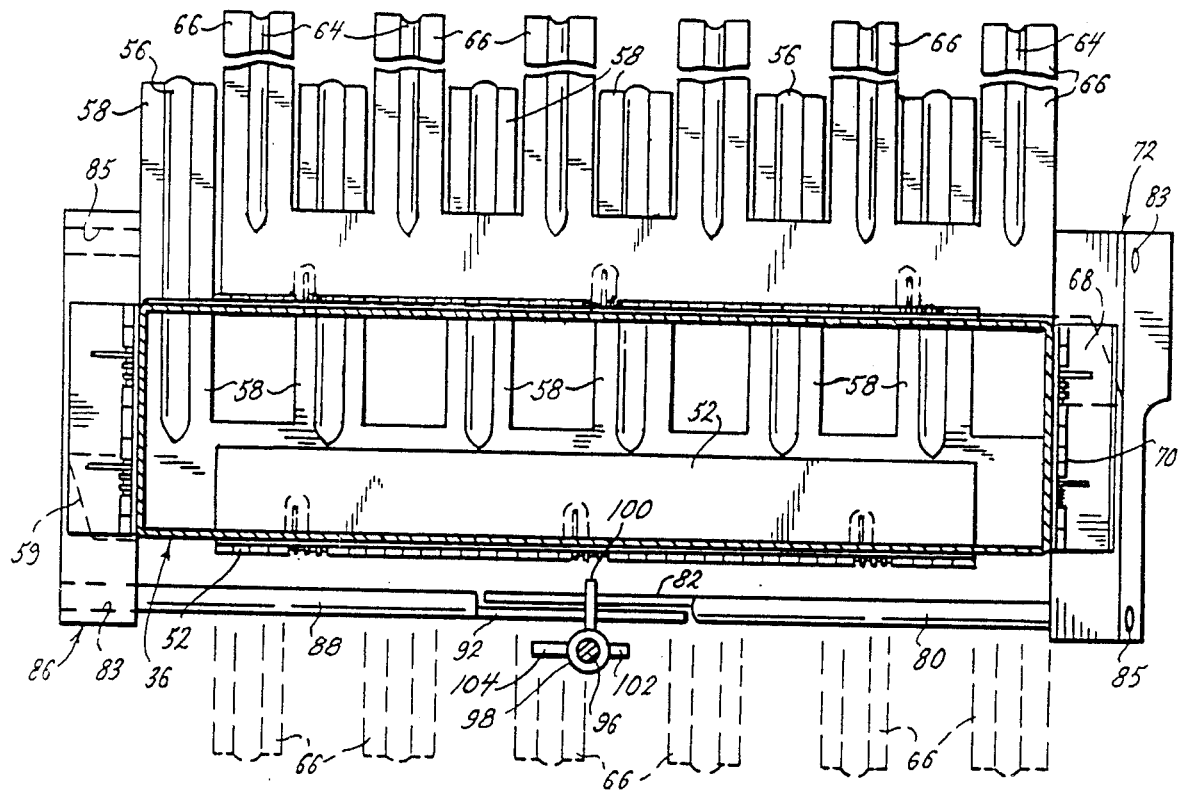
FIG. 5 is another broken, sectional view, on the scale of FIG. 3, and it is taken along a plane indicated by the line 5—5 in FIG. 3.
Figure 8:
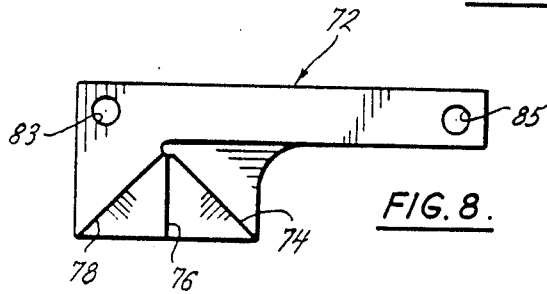
FIG. 8 is a side elevational view of the latch block of FIG. 7 before the elongated rod and cam are assembled with it.
Figure 10:
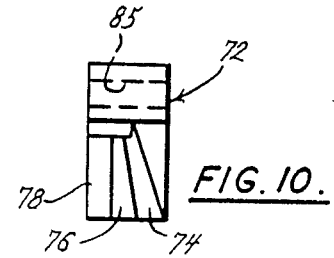
FIG. 10 is a view of the righthand end of the latch block of FIG. 8.
Figure 9:
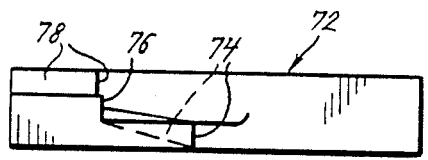
FIG. 9 is a bottom view of the latch block of FIG. 8.
Figure 6:
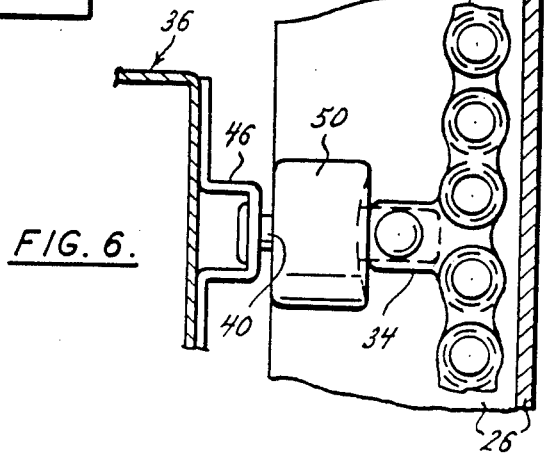
FIG. 6 is a horizontal sectional view, on the scale of FIG. 3, through part of the carrier of FIG. 2 and through one of the supporting tracks for that carrier and it is taken along a plane indicated by the line 6—6 in FIG. 4.

The numeral 52 denotes a spring-equipped, piano-type hinge that has one plate thereof attached to the lower portion of the outer surface of the outer broad planar side of a carrier 36; and it has the other plate thereof attached to the upper portion of a gate or door 54. That gate has a number of elongated, spaced-apart fingers 58; and each of those fingers has an upwardly-projecting, elongated, stiffening rib 56 therein. A generally trapezoidal abutment 59, which is shown by dashed lines in FIGS. 3 and 5, is provided at the lefthand end of the gate 54 adjacent the upper edge of that gate. That abutment extends outwardly beyond the lefthand end of the carrier 36 as that carrier is viewed in FIG. 3.

The numeral 60 denotes a spring-equipped, piano-type hinge which has one plate thereof secured to the lower portion of the outer surface of the inner broad planar side of the carrier 36; and it has the other plate thereof secured to the upper portion of a gate or door 62. That gate has a number of elongated, spaced-apart fingers 66; and each of those fingers has an upwardly-projecting, elongated, stiffening rib 64 therein. A generally trapezoidal abutment 68, which is best shown in FIG. 3, is provided at the righthand end of the gate 62 adjacent the upper edge of that gate. That abutment extends outwardly beyond the righthand end of the carrier 36 as that carrier is viewed in FIG. 3. The hinges 52 and 60 mount the gates 54 and 62 so the fingers 58 fit between and extend beyond the fingers 66, and vice versa. In doing so, those fingers positively keep any article from being accidentally released from any carrier.

The upper plates of the hinges 52 and 60 are secured to the exterior surfaces of the broad planar sides of the carrier 36, as shown by FIG. 4, so those plates will not interfere with the free downward movement of articles into and through that carrier. The lower plates of those hinges are secured to the inner faces of the gates 54 and 62, as shown by FIG. 4, so those gates will not interfere with free movement of articles onto and along the lengths of the inner faces of those gates.

Figure 2:
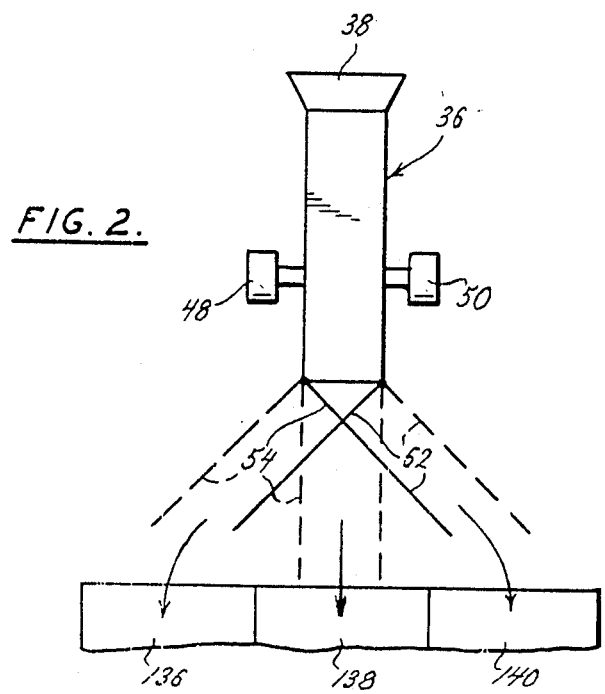
FIG. 2 is a kinematic end view, on a larger scale, of one of the carriers of the system shown in FIG. 1; it shows the normal or "closed" position of the gates or doors of that carrier by solid lines; it shows the two moved positions of each of those gates or doors by dashed lines; and it shows the upper portions of the receptacles of one group of transversely-arranged receptacles.

The normal position of the gate 54 is shown by solid lines in FIGS. 2 and 4; and the normal position of the gate 62 is shown by solid lines in FIG. 2. The springs of the hinge 52 bias the gate 54 for clockwise rotation in FIG. 4; and the springs of the hinge 60 bias the gate 62 for counter clockwise rotation in that view. The gate 54 can be permitted to rotate downwardly in the clockwise direction to a vertical position that is shown by dashed lines in FIGS. 2 and 4; or it can be permitted to rotate even further in that direction to a dashed-line position in FIG. 2 wherein it inclines downwardly from upper right to lower left. The gate 62 can be permitted to rotate downwardly in the counter clockwise direction to a vertical position that is shown by dashed lines in FIGS. 2 and 4; or it can be permitted to rotate even further in that direction to a solid-line position in FIG. 4 wherein it inclines downwardly from upper left to lower right. Although the springs of the hinges 52 and 60 bias the gates 54 and 62 for prompt movement into the dashed-line, inclined positions shown in FIG. 2—wherein those gates incline downwardly and away from the carrier 36—those gates are normally held in the solid-line positions of FIG. 2 by the engagement between abutment 59 and a latch block 86 and by the engagement between abutment 68 and a latch block 72.

The latch block 72 is rotatably secured to the right-hand end of the carrier 36, as that carrier is viewed in FIG. 3, by a spring-equipped, piano-type hinge 70. One plate of that hinge is secured to the righthand end of the carrier 36, and the other plate is secured to the top of the latch block 72; and the spring of that hinge urges that latch block to rotate in the clockwise direction into a position which is parallel to that righthand end. The latch block 72 has a stop 74 thereon which will receive the abutment 68 and thereby hold the gate 62 in the solid-line position of FIG. 2, whenever that latch block occupies a position which is comparable to the position shown for the latch block 86 in FIG. 3. The latch block 72 has a second stop 76 which will permit the springs of the hinge 60 to rotate the gate 62 to the dashed-line vertical position shown by FIGS. 2 and 4 until the abutment 68 engages and is held by that stop. That latch block has a third stop 78 which will enable the springs of the hinge 60 to rotate the gate 62 to the dashed-line inclined position which extends from upper left to lower right in FIG. 2 until the abutment 68 engages, and is held by that stop. The numeral 80 denotes an elongated rod which has one end thereof threaded and seated within a threaded hole 85 adjacent one end of the latch block 72, as shown particularly by FIG. 7. A further threaded hole 83 is provided adjacent the other end of that latch block. Only one of the threaded holes 83 and 85 will be used to receive an elongated rod.

The latch block 86 is identical to the latch block 72; but it has the threaded end of an elongated rod 88 seated in the opening 83 thereof; whereas the latch block 72 has the threaded end of the elongated rod 80 seated in the opening 85 thereof. The latch block 86 is rotatably secured to the lefthand end of the carrier 36, as that carrier is viewed in FIG. 3, by a spring-equipped, piano-type hinge 84. One plate of that hinge is secured to the lefthand end of the carrier 36, and the other plate is secured to the top of the latch block 86; and the spring of that hinge urges that latch block to rotate in the counter clockwise direction into the position shown by FIG. 3. Making the latch blocks 72 and 86 identical reduces the cost of making those latch blocks. It is only necessary for an assembler to insert the threaded ends of the elongated rods 80 into the threaded holes 85 of the latch blocks 72, and to insert the threaded ends of the elongated rods 88 into the threaded holes 83 of the latch blocks 86.

The stops 74, 76 and 78 on the latch block 86 will coact with the abutment 59 on the gate 54 to establish a normal, solid-line position for that gate in FIGS. 2 and 4, and an inclined solid-line position for that gate in FIG. 4. When the latch block 86 is held in the position shown by FIG. 3, by the springs of hinge 84, the stop 74 thereon will hold the gate 62 in the solid-line position of FIG. 2. When that latch block is in a position comparable to that of the latch block 72 in FIG. 3, the stop 78 and the springs of hinge 60 will hold the gate 62 in the inclined solid-line position of FIG. 4; and, when the latch block 86 is in a position intermediate those of that latch block and of the latch block 72 in FIG. 3, the stop 76 and the springs of hinge 60 will hold the gate 62 in the dashed-line vertical position of FIGS. 2 and 4.

The elongated rod 80 has a thin, generally-triangular cam 82 formed integrally with, and extending upwardly from, the free end thereof; and the elongated rod 88 has an identical cam 92 formed integrally with, and extending upwardly from, the free end thereof. The fact that the cams 82 and 92 are thin enables them to be disposed immediately adjacent each other, as shown in FIG. 5. The springs of the piano-type hinges 70 and 84 normally hold the cams 82 and 92 in the upper position shown by solid lines for the cam 92 in FIGS. 3 and 4. However, those springs can yield to permit those cams to be moved downwardly to intermediate positions indicated by dashed-lines for the cam 92 in FIG. 3. In fact, those springs can yield to permit those cams to be moved downwardly to fully-moved positions indicated by the position of cam 82 in FIGS. 3 and 4. The cam 82 will be in its normal position whenever the cam 92 is in its fully-moved position, and vice versa. However, when either of the cams 82 and 92 is in its intermediate position, the other cam also will be in its intermediate position.

The numeral 94 denotes a rotary solenoid which is secured to a bracket 93 which, in turn, is secured to the outer track 30, as indicated particularly by FIG. 4. The shaft 96 of that solenoid supports the hub of a cam 98 which has an inverted L-shaped arm 100, an abutment 102 which extends downwardly to the level of the lower end of the arm 100, and an abutment 104 that is displaced above the lower ends of arm 100 and of abutment 102. As shown particularly by FIG. 5, the abutments 102 and 104 lie in the same plane, and the L-shaped arm 100 is displaced ninety degrees from that plane. The normal position for the cam 98 is one hundred and eighty degrees from the position shown in FIG. 5; namely, a position wherein the arm 100 extends away from, rather than toward, the paths of travel of the cams 82 and 92, wherein the abutment 104 occupies the position occupied by the abutment 102 in FIG. 5, and wherein the abutment 102 occupies the position occupied by the abutment 104 in FIG. 5. Different rotary solenoids could be used; but a Ledex 12-position rotary solenoid stepping switch, part number 250-404-244, could be used by substituting the cam 98 for the "circuit decks" of that switch.

Figures 16, 17, 18, 19:
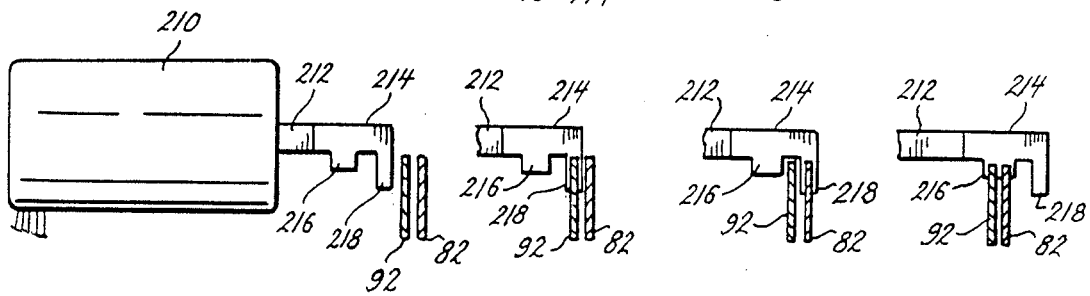
FIG. 16 is a side elevational view of a solenoid with a reciprocable plunger and actuator, and it shows the plunger and actuator in their retracted positions relative to two cams which have moved past that actuator.
FIG. 17 is a broken view of the plunger and actuator in one extended position wherein it actuated and then released one cam and that cam subsequently returned to its normal position as the door or gate associated with it was re-closed.
FIG. 18 is another broken view of the plunger and actuator, and it shows the plunger and actuator in a further extended position wherein it actuated and then released the other cam and that cam subsequently returned to its normal position as the door or gate associated with it was re-closed.
FIG. 19 is yet another broken view of the plunger and actuator, and it shows the plunger and actuator in fully extended position wherein it actuated and then released both cams and those cams subsequently returned to their normal positions as the doors or gates associated with them were re-closed.

A four-position, programmable, reciprocating solenoid is preferred over a rotary solenoid; because the plunger of a reciprocating solenoid can apply stronger forces to cams 82 and 92 than can a rotary solenoid. Such a solenoid is shown in FIGS. 16-19; and it is the preferred form of solenoid for the sorting system of the present invention. That solenoid includes a housing 210, a plunger 212, and an actuator 214. For clarity of showing, that actuator is shown in the positions it occupies when it is intended to actuate neither cam 82 nor cam 92 (FIG. 16), to actuate only cam 92 (FIG. 17), to actuate only cam 82 (FIG. 18), or to actuate both of those cams (FIG. 19). The cams 82 and 92 are shown in their normal, upper positions; although one or both of them will have been moved downwardly by one or the other of the abutments 216 and 218 on actuator 214 as those cams moved forwardly past that actuator at right angles to the plane of the paper. Those cams will remain in their downward positions until the gates or doors that are associated with them are re-closed.

The housing 210 has an internal spring which normally holds the plunger 212 in the retracted position shown by FIG. 16; but that spring can yield to permit that plunger to move to any one of three extended positions that are shown by FIGS. 17-19. The housing 210 also has a tapped coil or a plurality of coils therein which can move the plunger 212 to, and hold it in, any one of those extended positions. The plunger 212 has an acircular cross section to keep it from rotating relative to the housing 210 as it reciprocates relative to that housing. A typical four position solenoid is marketed as an Airpax Linear Displacement Solenoid.

The abutment 216 on actuator 214 will perform the functions of the abutment 104 on the cam 98 in FIGS. 3 and 5. Specifically, the solenoid can be energized to cause the plunger 212 to dispose the abutment 216 in position to engage both of the cams 82 and 92, which are shown in their normal, upper positions by FIG. 19; and the resulting downward movements of those cams, to the dashed-line lower position for cam 92 in FIG. 3 as the carrier 36 moved forwardly past the housing 210, freed both gates 54 and 62 for movement to the vertical positions shown by dashed lines in FIGS. 2 and 4. As those gates were subsequently re-closed those cams returned to the normal, upper positions shown by FIG. 19. The abutment 218 on the actuator 214 will selectively perform the functions of both of the abutments 100 and 102 in FIGS. 3-5. Specifically, the solenoid can be energized to dispose the abutment 218 in position to ingage the cam 82, which is shown in its normal, upper position by FIG. 18; and the resulting downward movement of that cam, to the lower position shown by FIG. 3 as the carrier 36 moved downardly past the housing 210, freed the gate 62 for movement to the inclined position shown by solid lines in FIG. 4. As that gate was subsequently re-closed, that cam returned to the normal upper position of FIG. 18. Alternatively, the solenoid can be energized to dispose the abutment 218 in position to engage the cam 92, which is shown in its normal, upper position by FIG. 17; and the resulting downward movement of that cam to a lower position corresponding to the position of cam 82 in FIG. 3 as the carrier 36 moved forwardly past the housing 210, freed the gate 54 for movement to the dashed-line, inclined position of FIGS. 2 and 4. As that gate was subsequently re-closed, that cam returned to the normal upper position of FIG. 17.

The engagement between the acircular plunger 212 and the guide therefor in the housing 210 will be loose enbough to permit ready reciprocation of that plunger relative to that housing, but will be close enough to enable lthat plunger and the actuator 214 to force the cams 82 and 92 to move downwardly to any of the positions indicated by FIG. 2. If very heavy objects were to be loaded into the carriers 36, with consequent very heavy frictional forces between the latch blocks 72 and 86 and the abutments 68 and 59, a back-up plate could be mounted behind the upper portion of the actuator 214. Such a back-up plate would enable the actuator 214 to force the cams 82 and 92 to move downwardly in any of the positions indicated by FIG. 3 even when very heavy objects were loaded into the carriers 36.

The direct transfer sorting system 20 will have a large number of carriers 36; and it will have a large number of groups of transversely-arranged receptacles disposed below the level of those carriers. The numerals 112, 114, 116, 118, 120, 122, 124, 126, 128 and 130 denote groups of three transversely-arranged receptacles which are arranged along the lengths of straight sections of the carrier-supporting tracks 26 and 30. The centermost receptacle of each group of three transversely-arranged receptacles should be mounted directly under the path of the carriers, another of those receptacles should be mounted inwardly of that path, and the third of those receptacles should be mounted outwardly of that path.

If desired, groups of two transversely-arranged receptacles could be mounted adjacent three of the arcuate sections of the track 30 of the direct transfer sorting system 20. In such event, one of the two receptacles of each group of two transversely-arranged receptacles should be mounted directly under the path of the carriers, and the other of those receptacles should be mounted outwardly of that path.

A rotary solenoid 94 and a cam 98 must be mounted a short distance in advance of the longitudinal center of each group of transversely-arranged receptacles. Such an arrangement will compensate for the trajectory in which an article will tend to follow as it is released from a carrier 36. Alternatively, a four-position, programmable, reciprocating solenoid with its three-abutment plunger could be mounted a short distance in advance of the longitudinal center of each group of transversely-arranged receptacles.

The numeral 106 denotes a driving motor, which has a suitable speed-reducing gear train associated with it, and that motor and gear train will drive a sprocket which, in turn, will drive the chain 32. The motor 106 will be mounted on a support 108 adjacent one corner of the inner track 26.

The numeral 110 generally denotes a loading mechanism which will direct articles into the various carriers 36 of the direct transfer sorting system 20, as those carriers are moved under that loading mechanism. The showing of the loading mechanism 110 is schematic in nature, and that mechanism is not shown in detail; because it is not, per se, a part of the present invention. That loading mechanism will preferably have transfer carriers that move above, and parallel to, the carriers 36 as the articles are transferred from those transfer carriers to the carriers 36.

One group of three transversely-arranged receptacles is shown in FIG. 2; and the centermost receptacle 138 is located directly under the path of the carriers 36, the receptacle 140 is located well inwardly of that path, and the receptacle 136 is located well outWardly of that path. The structure and details of the receptacles are not critical; and hence the various receptacles are shown in the drawing as metal bins. However, the various receptacles can readily, and frequently will, be sacks that are held in position with the upper ends thereof open to receive articles released by the carriers 36.

The numeral 144 generally denotes a gate-closing station wherein all of the gates 54 and 62, which are not in the normal, solid-line, "closed" positions of FIG. 2, will be automatically moved to those positions. As those gates are moved to their "closed" positions, the springs of the hinges 70 and 84 will dispose each of the latch blocks 72 and 86 in the closed-gate position shown for the latch block 86 in FIG. 3. That gate-closing station has brackets 146 and 152 which are secured to, and which depend downwardly from, a bracket 28 and a beam 24 adjacent arcuate portions of tracks 26 and 30 intermediate the group 130 of transversely-arranged recptacles and the loading mechanism 110. Horizontally-disposed plates 148 and 154 are secured to, and extend inwardly from, the lower ends of the brackets 146 and 152, respectively, and the inner edges of those plates confront each other. Those inner edges converge, as they are viewed from their front edges to their rear edges; and those inner edges are provided with noses 150 and 156 which are made from a tough, plastic material that has a low coefficient of friction. One such material is Teflon.

The leading edges of the plates 148 and 154, and of the noses 150 and 156 thereon, are spaced far enough apart to accomodate the upper portions of gates 54 and 62 which are in their "fully-moved" positions. The rear edges of the plates 148 and 154, and of the noses 150 and 156 thereon, are spaced close enough together to force the upper portions of any gates 54 and 62, which are not in their "closed" positions as they are moved toward the gate-closing station 144, to move into such positions.

The low coefficient of friction of the material of the noses 150 and 156, and the gradual closing action provided by those noses, will minimize any tendency of the gate-closing station to "wear" the leading edges of the upper portions of the gates 54 and 62. If any wear should be observed, U-shaped clips of wear-resisting material could be pressed onto, or otherwise secured to, those leading edges.

The portions, of the bottom edges of the cams 82 and 92 which are remote from the hinges 70 and 84, respectively, are relieved. As a result, all portions of those bottom edges will be located above the levels of the upper faces of the plates 148 and 154 and of the gates 58 and 66—in all moved positions of those cams. Consequently, the cams 82 and 92 will not engage and be jammed against any parts of the sorting system.

The motor 106 continuously drives the chain 32 in the same direction; and hence the carriers 36 continuously move in the same direction around the predetermined path that is defined by the tracks 26 and 30. Before each carrier reaches the loading mechanism 110, the noses 150 and 156 of the plates 148 and 154 of the gate-closing station 144 will force each gate of that carrier, which is not in its normal "closed" position, to move into that position. As the gates of the carriers are moved into their "closed" positions, the abutments 59 and 68 thereon will be moved into positions wherein they will be held by the stops 74 on the latch blocks 86 and 72 of the carriers. Those stops will keep those doors in their "closed" positions until such time as one or the other or both of the latch blocks 72 and 86 are moved out of the normal positions indicated at the lefthand side of FIG. 3 for the latch block 86.

The articles which are introduced into the carriers 36 will preferably be encoded with information which will cause the rotary solenoids 94, adjacent the various groups of transversely-arranged receptacles, to remain inactive until a carrier has moved an article close to a position where it should be released from that carrier. Immediately prior to the time a carrier moves an article into such a position, the direct transfer sorting system 20 will, in response to the previously-read encoded information on the article, cause the rotary solenoid 94 adjacent that position to become energized. If the article is to be directed into the central receptacle 138, the solenoid 94 will be actuated to cause the cam 98 to dispose the abutment 104 in the paths of both of the cams 82 and 92. As the carrier then moves the inclined leading faces of those cams into engagement with that abutment, those cams will move downwardly to the intermediate position indicated by dashed lines for the cam 92 in FIG. 3; and, in those intermediate positions, the tops of the cams 82 and 92 will be at the level of the bottom edge of the abutment 104. As those cams are moved downwardly to those intermediate positions, the elongated rods 80 and 88 will force the latch blocks 72 and 86 to rotate away from the normal positions thereof to positions intermediate the normal position indicated for the latch block 86 in FIG. 3 and the fully-moved position indicated for the latch block 72 in that view. As those latch blocks are moved to those intermediate positions, the stops 74 on those latch blocks will be moved out of register with the abutments 68 and 59. Thereupon, the springs of the hinge 52 will force the gate 54 to rotate in the clockwise direction from its normal, solid-line position to its dashed-line, vertical position in FIG. 2; and the springs of the hinge 60 will force the gate 62 to rotate in the counter clockwise direction from its normal, solid-line position to its dashed-line, vertical position in FIG. 2. The abutments 59 and 68 on the gates 54 and 62 will be intercepted and held by the stops 76 on the latch blocks 86 and 72; and, thereupon, the gates 54 and 62 will guide the article as it is directly transferred from the carrier 36 into the receptacle 138.

The tops of the receptacles 136, 138 and 140 must be below the levels of the arcuate paths that are followed by the lower ends of the fingers 58 and 66 of the gates 54 and 62, as those gates move from their normal, solid-line "closed" positions to the dashed-line vertical positions, or to the dashed-line fully-moved positions of FIG. 2; because those gates tend to remain in any positions they assume as a result of the cam-induced rotation of the latch blocks 86 and 72. In fact, each gate 54 and 62 will remain in its assumed position until its carrier reaches the gate-closing station 144; which will then return all gates to the normal solid-line "closed" position of FIG. 2.

If the article is to be transferred to the inner receptacle 140, rather than to the centermost receptacle 138, the rotary solenoid 94 will be actuated to rotate the cam 98 to the position shown by FIG. 5 wherein the bottom of the inverted L-shaped arm 100 will be in the path of the cam 82 on the elongated rod 80 but will be out of the path of the cam 92 on the elongated rod 88. As a result, when the longitudinal midpoint of the carrier approaches the cam 98, the cam 92, the elongated rod 88 and the latch block 86 will be permitted to remain in the solid-line positions shown therefor by FIG. 3; but the cam 82 and the elongated rod 80 and the latch block 72 will be moved to the positions shown therefor by that view. Thereupon, the gate 62 will respond to the springs of the hinge 60 to rotate until the abutment 68 on that gate engages and is held by the stop 78 on the latch block 72. As that abutment engages, and is held by, that stop, the gate 62 will be in the dashed-line inclined position which extends from upper left to lower right in FIG. 2; and hence that gate will be parallel to the gate 54 which is still in its normal, solid-line "closed" position. At this time, the article, which had been held within the carrier 36, will slide along the upper surfaces of the fingers 58 of the gate 54 and will be guided and confined by the gates 54 and 62 until it drops into the receptacle 140. Those gates will remain in those inclined positions until the carrier 36 again reaches the gate-closing station 144—at which time the gate 54 will be left in its "closed" position, but the gate 62 will be moved into its "closed" position. At such time, the abutment 68 on that gate will move inwardly of the stop 74 on the latch block 72; and the springs of the hinge 70 will rotate that latch block to a position similar to that shown for the latch block 86 in FIG. 3.

If the article is to be transferred to the outermost receptacle 136, rather than to the centermost or inner receptacles 138 and 140, the rotary solenoid 94 adjacent the group of receptacles, which includes the receptacle 140, will be actuated to dispose the cam 98 in position to place the abutment 102 in the path of the cam 92. That abutment is so narrow that it will not extend into the path of the cam 82; and hence, as the carrier 36 moves the cam 92 into engagement with the abutment 102, the cam 82, the rod 80 and the latch block 72 will remain in their gate-closed positions and will permit the gate 62 to remain in the normal solid-line "closed" position of FIG. 2. However, the abutment 102 will cause the cam 92 to move downwardly, and will thereby force the elongated rod 88 and the latch block 86 into positions which are comparable to those shown for the cam 82, the elongated rod 80 and the latch block 72 in FIG. 3. Thereupon, the gate 54 will respond to the springs within the hinge 52 to move to and through the dashed-line vertical position to the fully-moved inclined position in FIG. 2, wherein that gate inclines downwardly from upper right to lower left. At such time, the article which had been held by the carrier 36 will slide along the upper surface of the gate 62; and it will be guided and confined by that gate and the gate 54 until it drops into the receptacle 136. Those gates will remain in those inclined positions until the carrier 36 again moves into the gate-closing station 144.

As shown particularly by FIG. 2, the gate 54 completely blocks access to the centermost receptacle 138 and to the outer receptacle 136, whenever that gate is in its normal, solid-line "closed" position. Similarly, the gate 62 completely blocks access to the receptacle 138 and to the inner receptacle 140, whenever it is in its normal solid-line "closed" position. This is important; because it means that even when the gate 62 is moved by the springs of the hinge 60 to the dashed-line, fully-moved, inclined position in FIG. 2, the gate 54 will positively keep any article within the carrier 36 from getting into either of the receptacles 136 and 138. Conversely, it means that when the gate 54 responds to the springs of the hinge 52 to move to the dashed-line, fully-moved inclined position of FIG. 2, the gate 62 will positively keep any article within the carrier 36 from getting into either of the receptacles 138 and 140. Further, when the gates 54 and 62 are in their dashed-line vertical positions, they will keep articles within the carrier from getting into either of the receptacles 136 and 140. As a result, the gates 54 and 62 will coact to make certain that each article is directed to just one receptacle, and is guided all the way into that receptacle.

The carriers 36 are mounted so each of them has a long axis in plan view which moves parallel to the path of movement of the chain 32; and such an arrangement is desirable, because it enables a group of receptacles to have the same length, along that path, which any one of those receptacles has along that path. However, if desired, the carriers could be mounted so each of them had a long axis in plan view which was transverse of the path of movement of the chain 32. In such event, the receptacles of each group of receptacles, would be arranged along, rather than transversely of, that path of movement.

The latch blocks 72 and 86 and the gates 62 and 54 coact to hold an article until the carrier 36 reaches a predetermined group of receptacles; and then they coact to direct that article into a centermost, an inner, or an outer receptacle. If desired, the latch blocks 72 and 86 and the gates 62 and 54 could be arranged to hold an article until the carrier 36 reached a predetermined group of just two receptacles; and then they could coact to direct that article into a receptacle directly below that carrier or into a laterally-spaced receptacle of such a group or, alternatively, into an inner or an outer receptacle of such a group.

The use of spring-equipped hinges to bias the gates 54 and 62 for rotation, and the use of the latch blocks 86 and 72 to hold those gates in predetermined positions, are very useful where relatively-heavy articles are transported by the carriers 36. Also, it is useful where it is desired to free the carriers 36 from all electrical and electronic components. However, where light-weight articles are to be transported by the carriers 36, rotary solenoids or other rotary actuators could replace the springs in hinges 52 and 60 and also could replace the latch blocks 72 and 86.

The use of spring-equipped hinges to bias the gates 54 and 62 for rotation, and the use of the latch blocks 86 and 72 to hold those gates in predetermined positions, make the direct transfer sorting system 20 extremely reliable and predictable; because each carrier has just eight moving parts: the two rollers 48, the two rollers 50, the two gates 54 and 62, and the two latch blocks 86 and 72. The resulting reliability and predictability, plus the absence of any need for chutes or guides, make the direct transfer sorting system 20 very useful and desirable.

Figure 15:
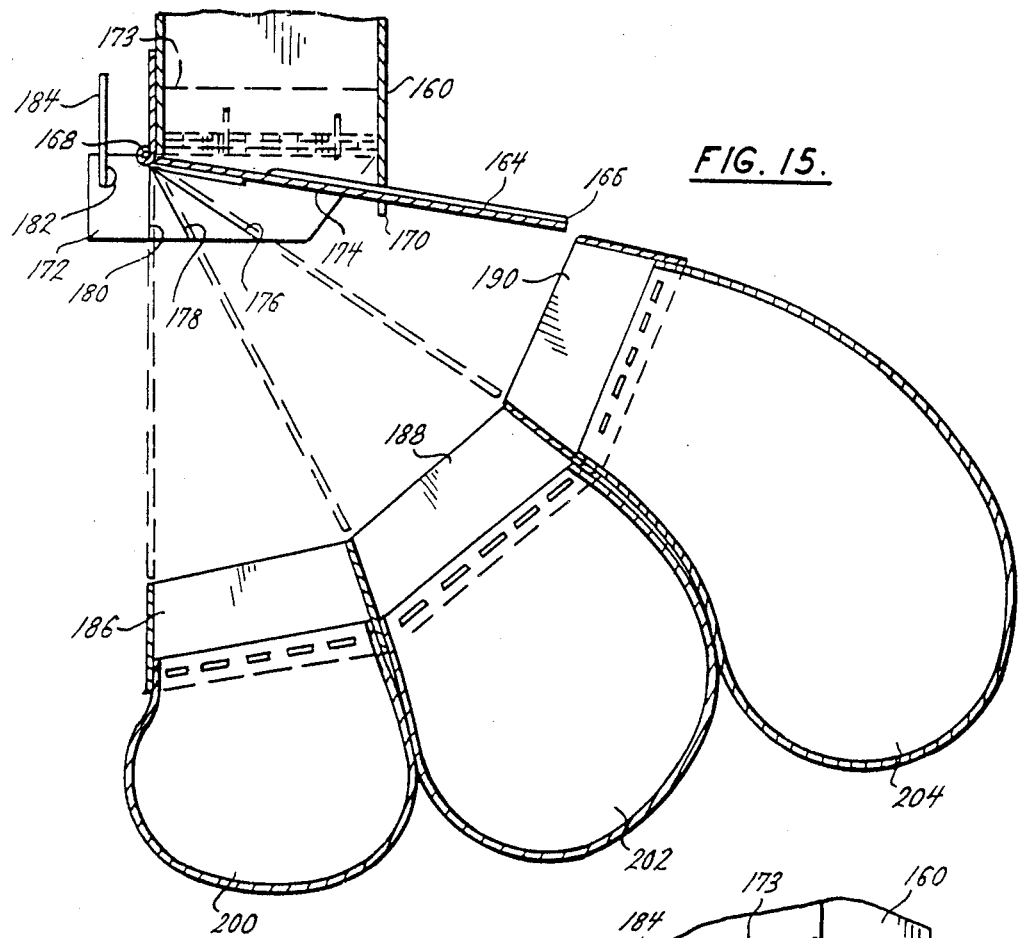
FIG. 15 is a vertical section through the carrier of FIG. 14 and through three receptacles below the level of, and adjacent to, that carrier.
Figure 14:
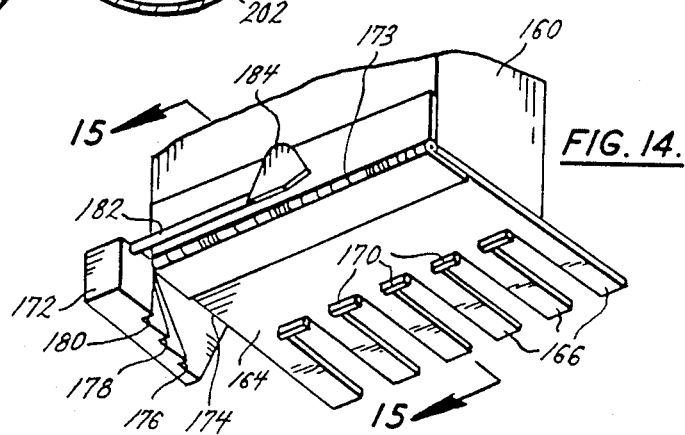
FIG. 14 is a perspective view of the bottom portion of an alternate form of carrier which has just one door or gate.

If desired, the bottom of one or more of the carriers 36 could be constituted by a single gate or door instead of the two gates 54 and 62; and such an arrangement is shown by FIGS. 14 and 15. The numeral 160 denotes a carrier which will preferably be very similar to the carrier 36—having a hinge 168 like the hinge 52, a gate 164 like the gate 54, a latch block 172 similar to the latch block 86, a rod 182 like the rod 88, a cam 184 like the cam 92, a hinge 173 like the hinge 84, and rollers like the rollers 48 and 50. However, instead of having a hinge 60 and a gate 62, the carrier 160 has downwardly-extending fingers 170 at the lower edge of one planar side thereof; and those fingers are spaced apart to accomodate the fingers 166 of the gate 164. The latch block has stops 174, 176, 178 and 180 which can selectively engage one side of the gate 164 and thereby selectively hold that gate in a fully-closed, horizontal position as shown by FIGS. 14 and 15, a first moved position wherein it is forty degrees below the horizontal, a second moved position wherein it is sixty-seven and one half degrees below the horizontal, and a third moved position wherein it is vertical. A receptacle 186, with a removable, sack-like bottom 200, has all portions of the top thereof positioned directly under the path of the carrier 160. A second receptacle 188, with a removable, sack-like bottom 202, has one side thereof in common with that side of receptacle 186 which is remote from the hinge 173 for the gate 164; and a third receptacle 190, with a removable, sack-like bottom 204, has one side thereof in common with the other side of receptacle 188. The top of the receptacle 188 is set at a level above the top of the receptacle 186, the top of the receptacle 190 is set at a level above the top of the receptacle 188, and the tops of the three receptacles 186, 188 and 190 are set as close as possible to the arc defined by the free edge of gate 164. The stiffening ribs of the fingers 166 in FIG. 15 are not shown in FIG. 14.

As long as that gate is held in its fully-closed, horizontal position by the stop 174, the carrier 160 will hold any article deposited therein. When that gate is freed from the stop 174 and is then held by the stop 176 in its first moved position, wherein its free edge is adjacent the common wall of receptacles 188 and 190, it will direct an article into the receptacle 190. When the gate 164 is freed from the stop 174 and is then held by the stop 178 in its second moved position, wherein its free edge is adjacent the common wall of receptacles 186 and 188, it will direct an article into the receptacle 188—either directly or by a rebound from that portion, of the common wall between receptacles 188 and 190, which projects above the top of the other wall of receptacle 188. When the gate 164 is freed from the stop 174 and is then held by the stop 180 in its vertical position, wherein its free edge is adjacent the left-hand wall of receptacle 186, it will direct an article into that receptacle—either directly or by a rebound from that portion, of the common wall between receptacles 186 and 188, which projects above the top of the left-hand wall of receptacle 186. The downward rotation of the gate 164 will draw air downwardly through the carrier 160; and that air will help the article within that carrier move downwardly with that gate In the event any light-weight articles tended to drift toward the receptacle 188 instead of falling into the receptacle 186 when the gate 164 is in its vertical position, the top of the receptacle 186 could be widened to extend beyond the side of the carrier path, and thereby displace the receptacle 188 even further laterally from the hinge 173 for the gate 164. The use of two gates per carrier is preferred over the use of one gate per carrier; because it permits wider-top receptacles to be used, and because the two gates provide closer and more positive guiding of articles into the receptacles.

If desired, the gate-closing station 144 could be made to provide dynamic, rather than static, closing of the gates 54 and 62. For example, a pair of solenoids could be set at opposite sides of the path followed by the carriers; and pressure bars on the ends of the plungers thereof could move far enough toward each other to push the gates 54 and 62 into fully-closed position.

A reader and a computer, of the type customarily used in sorting systems, will "read" the code on the articles to be sorted by the direct transfer sorting system 20; and it will provide the required actuations of the rotary solenoids 94. Such a reader and computer are not shown because they are not, per se, a part of the present invention. That computer will preferably determine which rotary solenoid 94 is to be actuated by counting the carriers as they move past a photoelectric or other commercially-available counter.

The latch blocks 72 and 86 are useful and desirable; because each of them provides a holding function plus two positioning functions. However, if desired, the holding functions of the latch blocks could be performed by releasable stops, and the positioning functions of those latch blocks could be performed by pre-settable stops. The releasable stops would be mounted on the carrier 36 and could be selectively actuated by tripping mechanisms that were mounted on that carrier or that were mounted adjacent the path of that carrier; and the pre-settable stops would be mounted on the carrier 36 and could be pre-set at the time the code on the article was read, or could be pre-set as the carrier was moving from the loading location to an unloading location.

The present invention provides direct and immediate transfer of an article from a carrier into one of a plurality of closely-adjacent receptacles, while eliminating all need of the chutes, guides and sub-conveyors that have been used in prior sorting systems. As a result, the present invention provides a relatively-inexpensive sorting system which provides reliable and quick transfer of articles from carrier to receptacle.

Whereas the drawing and accompanying description have shown and described a preferred embodiment of the present invention it should be apparent to those skilled in the art that various changes may be made in the form of the invention without affecting the scope thereof.

What I claimed is:

1. Apparatus for sorting articles into a selected one of a multiplicity of article-receiving receptacles, said apparatus comprising a plurality of carriers, means for conveying said carriers together with said articles received therein along a predetermined path, each of said carriers having a carrier body defining a space for receiving and holding one or more of said articles as said carrier is conveyed along said path, a loading station along said path at which articles to be sorted are loaded into said carriers, a plurality of unloading stations along said path, each said unloading station having a group of said receptacles associated therewith, said carriers being selectively operable to effect the transfer of said articles carried thereby to a predetermined one of said receptacles constituting said group of receptacles associated with a selected one of said unloading stations, each of said carriers having a pair of independently movable gates carried by said carrier body, each gate having a first position such that with both of said gates in their said first positions said gates cooperate with one another to hold the articles within said carrier, each of said gates having a respective second position such that with one of said gates in its said first position and with the other of said gates in its second position said articles carried by said carrier are released from said carrier and are guided to a first one receptacle of said group of receptacles at said pre-determined one unloading station and such with said one gate in its second position and with said other gate in its first position said articles carried by said carrier are guided to a second receptacle of said group of receptacles at said pre-determined one unloading station, and each of said gates further having a third position such that with both of said gates in their respective said third positions said articles carried by said carrier are directed to a third receptacle of said group of receptacles at said predetermined unloading station, and selectively actuable means along said path for effecting movement of one or both of said gates of selected carrier to their stated respective second or third positions with said selected carrier in register with said one pre-determined unloading station thereby to effect the transfer of said articles carried by said selected carrier to either said first, second, or third receptacles of said group of receptacles at said predetermined one unloading station.

2. A sorting apparatus as set forth in claim 1 wherein at each one of said unloading stations along said path said of article receiving receptacles associated therewith constituting said group are positioned with respect to one another transversely of said path.

3. Sorting apparatus as set forth in claim 2 wherein said gates on each carrier are hinged with respect to said carrier body for swinging movement between said gate first, second, and third positions about an axis extending generally parallel to the direction of movement of said carrier along said path.

4. Sorting apparatus as set forth in claim 3 wherein each of said gates has a plurality of spaced fingers extending distally from said hinge axis, said fingers of said pair of gates for each of said carriers being interleaved when said gates are in their first or closed position.

5. Sorting apparatus as set forth in claim 3 wherein said selectively actuable gate operating means comprises cam means carried by each of said carriers, there being one of said cam means for each said gate associated with one of said carriers, and a selectively actuable cam follower means at each of said unloading stations associated with each of said cam means, said cam follower means being selectively actuable for movement between a retracted position in which said cam follower means is clear of its respective said cam means as a carrier is conveyed along said path and one or more operable positions in which said cam follower means is engageable by its respective said cam means as said carrier is conveyed along said path for effecting predetermined movement of said gates from their said first or closed positions to one or more of their other said positions so as to effect the transfer of said articles carried by said carrier into a selected one or said receptacles at a selected unloading station.

6. Sorting apparatus as set forth in claim 5 wherein each of said gates includes means for biasing each said gate for swinging movement about its respective said hinge axis toward its position most distal from its said first position such that said cam means upon engagement with a selected said cam follower means at a selected unloading station effects at least a partial release of said one gate associated with last-said cam means from its first or closed position for resilient movement toward its said second or third positions thereby to effect the selected release of said articles carried by said carrier.

7. Sorting apparatus as set forth in claim 6 wherein said cam means comprises a latch for each of said gates, each said gate having a latch finger co-operable with its respective said latch, said latch having at least one latch stop in which said gate finger is engageable by said at least one latch stop for holding said gate in said first or closed gate position against the bias of said gate biasing means, said latch being pivotally mounted with respect to said carrier for rotary movement upon being cammingly engaged by said cam follower means from a first position in which said latch maintains said gate in said first position to another of said gate second or third positions.

8. Sorting apparatus as set forth in claim 6 further comprising means located along said path prior to said loading station for effecting the closing of said gates of said carriers as said carriers are conveyed past said gate closing means.

9. Apparatus for sorting articles into a selected one of a multiplicity of article-receiving receptacles, said apparatus comprising a plurality of carriers, means for conveying said carriers together with said articles received therein along a predetermined path, each of said carriers having a carrier body defining a space for receiving and holding one or more of said articles therewithin as said carrier is conveyed along said path, a loading station along said path at which articles to be sorted are loaded into said carriers, a plurality of unloading stations along said path at which said carriers are selectively operated to effect the transfer of said articles carried by a selected one of said carriers to one of a group of said receptacles associated with a selected one of said unloading stations, each of said carriers having at least one independent moveable gate at the bottom of said carrier, said gate having a first or closed position for holding said articles within said carrier, said gate further having a second position relative to said carrier body in which said gate permits the articles carried by said carrier to be transferred to a selected on receptacle of a group of said receptacles at a selected unloading station, and said gate being further moveable to a third position which permits the articles carried by said carrier to be transferred from said carrier to a second selected receptacle of said group of receptacles along said path associated with said selected unloading station.

* * * * *